Nov. 21, 1967 J. R. FORD 3,354,359
ELECTROLYTIC CAPACITOR WITH COMPRESSED SEAL
Filed June 3, 1965
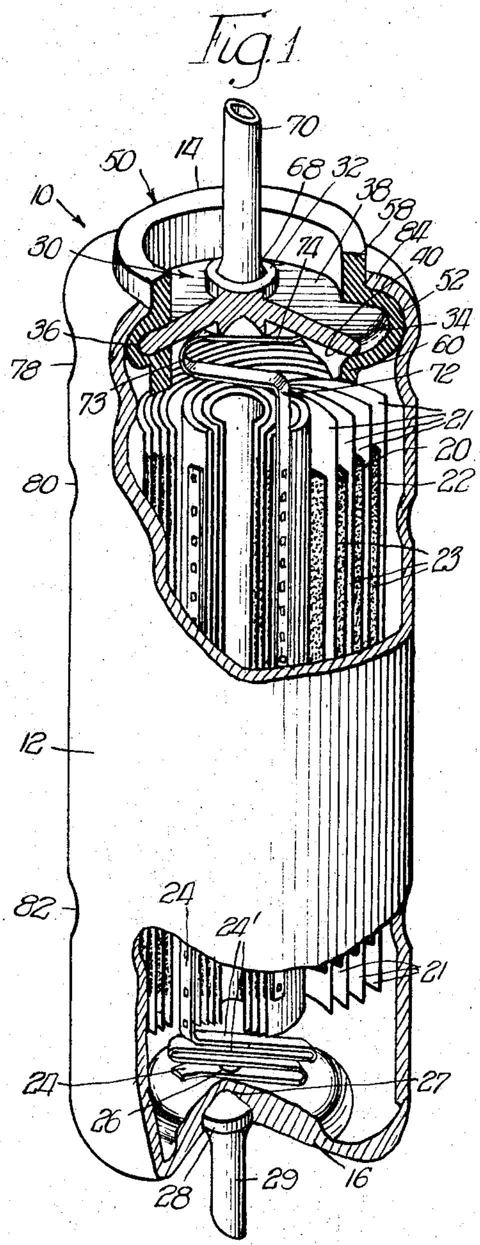
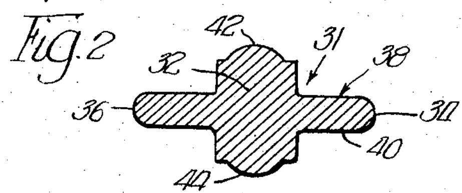
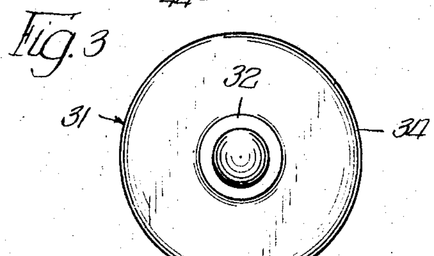
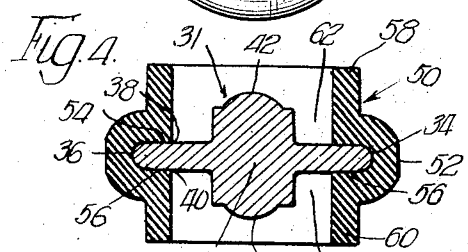
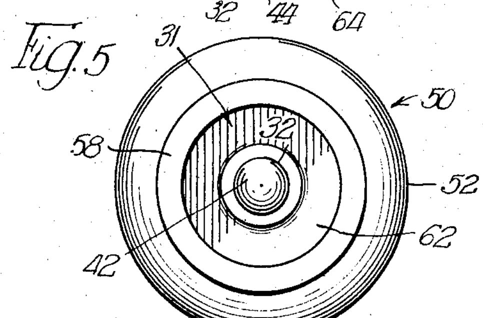
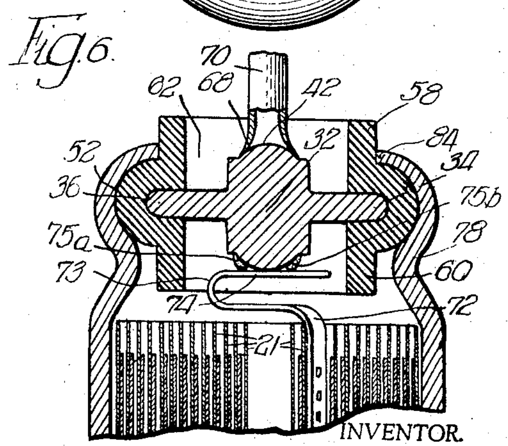
INVENTOR.
BY John R. Ford,
Brown, Jackson, Boettcher & Dienner
Attys.

United States Patent Office 3,354,359 Patented Nov. 21, 1967

3,354,359

ELECTROLYTIC CAPACITOR WITH COMPRESSED SEAL

John R. Ford, Pickens, S.C., assignor to Sangamo Electric Company, Springfield, Ill., a corporation of Delaware Filed June 3, 1965, Ser. No. 461,115
9 Claims. (Cl. 317—230)

ABSTRACT OF THE DISCLOSURE

The described capacitor comprises a container with a seal closing an end thereof. The seal includes a metallic insert having an annular flange between ends with a rubber annulus about its periphery in compressed engagement with the container wall.

The present invention relates to electrolytic capacitors, and more particularly to such capacitors of relatively small size suitable for computers and like uses.

One of the principal objects of the invention is to provide such a capacitor with an improved header or end seal for preventing the loss of electrolyte during normal usage. The life of an electrolytic capacitor is primarily dependent upon the effectiveness of this header or end seal. By minimizing or substantially eliminating the losses of the volatile components of the electrolyte from the capacitor, many of the electrical parameters can be expected to remain stable over a longer period of normal usage.

Electrolytic capacitors are composed essentially of metal, paper separators, electrolyte and an end seal. The quality or effectiveness of an electrolytic capacitor end seal may be reliably evaluated by conducting a life test at rated voltage and selected ambient temperature, and weighing the capacitor before and after the life test. The difference between these two weights is referred to as weight loss.

It is generally assumed that the weight loss during a life test is due to electrolyte loss. However, it has been discovered that in conventional capacitors the total loss of weight is further attributable to the loss resulting from the use of plastic materials for the end seal, and gas generated from the operation of the capacitor. Thus, in one conventional capacitor unit, it was found that 67% of the total weight loss was due to factors other than the electrolyte loss. Since it is the loss of electrolyte which provides an indication of the expected life of a capacitor, and such loss is only a fractional portion of the total weight loss, it is important that any weight loss tests made on a capacitor be of a nature to provide an accurate indication of the percentage of the total weight loss which is attributable to the electrolyte alone.

Using tests which recognize such distinction and provide such information, it was found that one conventional capacitor having a high quality phenolic rubber end seal of the type well known in the art has an average weight loss due to electrolyte alone which is in the order of .0025 gram or 33% of the total weight loss.

It is a specific object of the invention to provide a capacitor end seal of improved construction which substantially reduces the electrolyte loss of the capacitor, and more specifically a loss which is only a small fraction of the loss previously experienced with conventional end seals.

The improved end seal of the invention comprises an inner or central header in the form of a metallic hub or barrel-shaped core portion, preferably composed of aluminum, from an intermediate point of which radiates a circular sealing flange formed integral with the core portion. This end seal also comprises a ring shaped outer annulus of rubber or other insulating material of a similar resiliency, which is molded or stretched over said metallic sealing flange, so as to envelop the outer periphery and the top and bottom sides of the sealing flange. At the inner edges of the top and bottom walls of this rubber annulus are formed axially extending circular barrier flanges of substantial depth extending upwardly and downwardly from such top and bottom walls. In the sealing operation, the assembled end seal is set in the open upper end of the capacitor container, and this upper container end is then spun inwardly to form two crimping formations, the first of which consists of a lower inwardly extending bead which embraces part of the under side of the rubber annulus, and the second of which comprises a top crimping flange spun over the top wall of the rubber annulus into sealing contact around its entire periphery with the rubber annulus. This top crimping flange approaches the anode pin which is welded to the top of the aluminum header element. However, the upwardly extending barrier flange projecting from the top wall of the rubber annulus extends considerably above the top surface of the metallic top crimping flange and stands as an insulating barrier for minimizing the possibility of shorting the capacitor by reason of any foreign object dropping down or moving into position where it could contact both the anode pin and the top crimping flange of the container. Of greater import the upper barrier flange lengthens the creepage distance over the surface of the insulating material. These and other advantages of such flanged formation of the rubber annulus will be set forth more particularly in the detailed portion of the description.

Another object of the invention is to provide an improved small diameter axial lead type of capacitor devised for high reliability installations, such as for use in computers, wherein electrical connections made at the top and bottom ends of the capacitor are both welded connections, rather than pressure connections. For example, the weld at the upper anode connection is a ring shaped weld between the positive tab of the anode foil and the above described metallic header of the upper end seal to provide a more reliable joint. The weld at the lower cathode connection is an internally performed ring weld between the lower negative tab or lead from the negative foil, such being internally welded to the bottom wall of the casing.

Another object of the invention is to provide such an electrolytic capacitor characterized by an upper header assembly which, due to its novel design, is less expensive than other molded headers.

Another object of the invention is to have the upper end seal incorporate the use of only one organic material. Through the use of only one organic member in the seal, the possibility of contamination is reduced, and failures caused by deterioration of other organic components, such as plastics, are eliminated.

Still another object is to provide an end seal which takes less space than the ordinary or conventional capacitor seal. Thus, within a given size of capacitor housing it is possible to increase the size of the capacitor winding to obtain larger values of capacitance at a given voltage rating.

A further important object of the invention is to provide an end seal in which the cross sectional area of the organic material of the end seal is reduced to a minimum to thereby keep to a minimum the diffusion of gas or vapor through such material. The minimization of loss through gas or vapor diffusion in turn results in reduction of the total weight loss.

Other objects, features and advantages of the invention will be apparent from the following detailed description of one preferred embodiment thereof.

In the foregoing it has been assumed that the capacitor is an electrolytic capacitor. My invention may, however, be applied to other capacitors containing a fluid such as, for example, capacitors using oil impregnated paper as a dielectric. Accordingly, it is to be understood that the following description of my invention as applied to an electrolytic capacitor is by way of example only, and that, in its broader aspects, my invention is applicable to any suitable type of capacitor or component incorporating either an electrolyte or other appropriate fluid, leakage of which is to be avoided.

In the drawings:

FIGURE 1 is a perspective view of such representative embodiment on an enlarged scale, with the top and bottom ends broken away;

FIGURE 2 is a transverse sectional view of the metallic header;

FIGURE 3 is an end elevational view of the same;

FIGURE 4 is a transverse sectional view, showing the next step of molding or stretching the ring shaped rubber annulus around the above metallic inner header in the formation of the complete end seal assembly;

FIGURE 5 is an end elevational view of this end seal assembly;

FIGURE 6 is a transverse sectional view showing the step of welding the outside anode terminal wire to the upper end of the metallic header hub, and also the step of welding the inside anode tab connection to the lower end of the metallic header.

The electrolytic capacitor, designated 10, comprises a tubular shell or housing 12 preferably composed of aluminum, and having an open upper end 14 and a closed lower end wall 16.

The winding 18 of the capacitor comprises an anode foil strip 20 and a cathode foil strip 22 each composed of a thin high purity aluminum foil (of substantially 99.99+% purity), and wound spirally together with an intervening film of highly absorbent paper 21 therebetween. Through an improved etching process performed on the aluminum foil strips 20 and 22, as indicated as 23, considerable gain in the surface area exposed to the electrolyte is achieved, resulting in higher capacitance per unit size of capacitor housing 12.

The dielectric, which is a thin oxide film formed by applying greater-than-rated voltage for a precise period of time, assures the reliable operation and long life of the capacitor at its rated voltage. The etching of the cathode foil 22 also insures capacitance stability during normal operation and minimizes contact resistance between the foil 22 and the electrolyte. The intervening film of paper 21 also serves as a reservoir for the electrolyte, so that the combination affords excellent electrical conduction. Extending downwardly from the cathode foil strip 22 is a cathode lead or tab connection 24 which is reversely bent in a zig-zag formation 24′ for added resilience, both vertically and laterally, and which has its lower portion welded at 26 to the closed bottom wall 16 of the capacitor housing 12. Welded at 27 on the underside of the closed bottom wall 16 is the enlarged upper end 28 of a downwardly extending cathode terminal 29.

As briefly described heretofore, the upper end seal 30 comprises a metallic header 31 preferably composed of aluminum and constructed in the form of a hub or barrel-shaped core portion 32, from an intermediate point of which radiates an outwardly projecting circular sealing flange 34 integral with the core. This sealing flange 34 comprises a rounded outer peripheral edge 36 extending inwardly with substantially parallel flat upper and lower sealing surfaces 38 and 40 which join with the core portion 32 through fillets 38′ and 40′. The top and bottom ends 42 and 44 of the central core portion 32 are formed for effecting welding attachments, which will be later described. This entire metallic header is preferably anodized.

The end seal 30 also comprises a ring-shaped sealing annulus 50 of rubber or other insulating material having like resilient properties, which extends over the metallic sealing flange 34 so as to envelop the outer periphery 36 and to extend inwardly over the top and bottom surfaces 38 and 40 thereof. This rubber annulus is formed with a circular outwardly beaded portion 52 enveloping the rounded outer peripheral edge 36 of the sealing flange 34, and having inwardly extending flat sealing flanges 54 and 56 which have sealing engagement against the flat upper and lower sealing surfaces 38 and 40 of the metallic sealing flange 34. The inner edges of the upper and lower sealing flanges 54 and 56 terminate in upwardly and downwardly extending circular barrier flanges 58 and 60. These are spaced outwardly from the cylindrical outer wall of the core hub 32 to leave upper and lower annular spaces 62 and 64 therebetween and have the advantage of increasing the creepage distance of the surface of the insulating material.

Referring again to welding end surfaces 42 and 44 provided on the core portion 32, it will be seen from FIGURE 6 that there is welded to the upper surface 42 the lower end 68 of an upper anode terminal 70 which is essentially flat prior to welding. During welding the upper lead 70 has its lower end pushed into surface 42. The end surface 42 and the outwardly extended lower end 68 function to automatically center the terminal 70 with respect to the hub of the core portion 32 in the welding operation.

Referring now to the lower welding surface 44, this has welded thereto the anode lead or tab connection 72 leading upwardly from the anode foil 12, the upper portion of this anode tab being formed with a U-shaped or doubled-back formation 73 to provide a horizontal welding leg 74, the doubled back formation 73 giving the welding leg 74 freedom for vertical and lateral flexure. This welding leg 74 is welded to the lower welding surface 44 of the metallic insert 31 as shown at *75a*, *75b*. In one embodiment ultrasonic welds were made at *75a*, *75b*. This type of welding does not involve the use of current through the parts, but is accomplished by placing one part on an anvil and vibrating the other part against the first part ultrasonically through a tip or prod under some pressure. For example, the metallic insert 31 is placed on or held against an anvil, and the upper welding leg 74 of the tab 72 is held pressed against the welding surface 44 of this insert 31 under some substantial pressure. Simultaneously or substantially concurrently therewith, a high frequency vibration is transmitted through the contacting faces of the two parts, this vibration being of an ultrasonic frequency. The two separate ultrasonic welds *75a* and *75b* can be formed successively, or simultaneously by means of a double tip. If preferred, a ring weld comprising a single spot weld may be used. The absence of an electrically induced welding heat at this point of the capacitor structure minimizes the possibility of thermal damage to any of the adjacent parts. The result is a greatly improved welded connection of maximum conductivity which is substantially immune to severe vibration, and to longitudinal and lateral stresses, etc.

Referring again to the tubular shell or housing 12, it will be seen that this is formed with several vertically spaced case beads 78, 80 and 82 which space and center the winding 18 of the anode and cathode foils from the inner side walls of the shell 12, and which also afford vibration and shock protection. The upper bead 78 has its upper outward slope engaging under the circular beaded portion 52 of the rubber annulus 50. From this upper bead 78, the upper extremity of the tubular shell is crimped or spun inwardly to form the crimping lip 84 which folds inwardly over the top of the circular beaded portion 52 of the rubber annulus 50. The crimped lip 84 and bead 78 are important to the locking of the end seal 30 in the upper end of the tubular housing 12 in a hermetically sealed joint.

The hermetically sealed joint, however, is maintained and controlled by selective control of the displacement of the rubber annulus 50 caused by the inward crimping of tubular housing 12 toward end seal 30 with the rubber compressed between the outer annular surface 36 and tubular housing 12. The control of this rubber displacement not only effects a good reliable seal, but also effects an extremely small cross sectional area to minimize gas diffusion through the rubber. Briefly, the area through which gas or vapors may diffuse is the area between the outside diameter of part 32 and the inside diameter of housing 12 at the sealing point 52. According to the invention the initial outer diameter dimension of the housing is selected with relation to the final inside diameter of the tubular housing at the sealing point 52 to obtain a rubber displacement of approximately 20%.

It will be seen therefrom that the entire end seal construction results in the establishment of extensive areas of contacting sealing surfaces between the inner metallic header 31 and the enveloping rubber annulus 50; and that it also establishes extensive areas of contacting sealing surfaces between the circular rubber bead 52 and the metal bead 78 and crimping lip 84. These areas of contacting sealing surfaces are maintained under relatively high pressures set up in the beading and crimping operations as noted above, and such high pressures are maintained by the resilience of the rubber annulus 50. The result is a very tight end closure seal which effectively prevents loss of electrolyte from the capacitor, even when operating at relatively high temperatures.

It will be noted from FIGURE 6 that the upper rubber barrier flange 58 extends upwardly to a substantial distance above the level of the metallic crimping flange 84 to increase the creepage distance over the surface of the insulation material. Further, such barrier also effectively minimizes the possibility of the capacitor being shorted by any foreign object dropping or moving into a position where it might otherwise contact both the anode terminal wire 70 and the metallic crimping lip 84. It will also be noted that the lower rubber barrier flange 60 results in a symmetrical construction for facility of assembly, and furthermore functions as a spacer barrier to prevent the top edges of the anode or cathode foils moving upwardly accidentally and contacting the metallic header 31. They also increase the leakage or arcing distance between the anode 70 and the housing 12.

In a life test of two capacitors for 500 hours at rated voltage at 85° C. ambient temperature one of which had the conventional high quality phenolic-rubber end seal and the other of which had an end seal of the type set forth in the present invention, the conventional capacitor experienced a weight loss due to electrolyte of .0025 gram and the capacitor having the novel seal of the present invention had a weight loss of .0003 gram, or approximately ⅛ of the loss experienced in conventional high quality seals of the same material.

While the novel header design set forth hereinafter has been described in its use with a polar electrolytic capacitor, it will be apparent that the end seal also has utility in its application to a non-polar electrolytic capacitor. The conventional non-polar electrolytic capacitor may be essentially the same as the polar electrolytic capacitor described thus far with the exception that an aluminum tube (open both ends) is used in place of the can 12 with bottom 16, and accordingly an end seal 30 is placed and sealed into each end. Also, two anodes are used rather than one and one cathode.

With the non-polar capacitor, the rubber flanges 60 on both headers will press against winding 18, and hold the winding to prevent or minimize movement of the winding in the event the capacitor is subjected to vibration.

In addition, it will be apparent that the novel seal which provides an improved capacitor unit would also have utility in sealing dry batteries and oil filled paper capacitors as well as other electronic components.

It will be understood that the inventive concept disclosed is not intended to be limited to the illustrated embodiments thereof, since various changes and modifications therein may readily be made without departing from the scope of the invention.

What is claimed is:

1. In an electrolytic capacitor of the class described, an end seal for a substantially cylindrical housing having a capacitor within said housing including at least one terminal element extending through said end seal, said end seal comprising a metallic insert with a hub having between and spaced from its ends an outwardly extending annular flange, and a resilient annulus of insulating material extending about said flange and inwardly over the opposite faces thereof in pressure sealing contact therewith, said annulus having upper and lower flanges extending about said hub in substantially concentric spaced relation thereto and also extending above and below said hub, the upper portion of said housing being formed under pressure about the peripheral portion of said annulus effective for providing a fluid tight seal therewith and between said annulus and said flange of said hub.

2. A capacitor as set forth in claim 1 in which the outer diameter of said portion of said housing formed under pressure is displaced relative ot its original diameter by a distance sufficient to provide approximately 20% displacement of said resilient annulus between said housing and said metallic insert.

3. A capacitor as set forth in claim 1 in which the cross sectional area of said resilient annulus is a fractional part of the cross section of said end seal.

4. In an electrolytic capacitor of the class described, an end seal for closing the open end of a substantially cylindrical housing closed at its lower end by a bottom wall which includes a capacitor substantially impregnated with a fluid and a terminal connection extending through the seal, said end seal comprising a metallic insert with a hub having between and spaced from its ends an outwardly extending annular flange, and an annulus of resilient insulating material extending about said flange and inwardly over the opposite faces thereof in pressure sealing contact therewith, said annulus having upper and lower flanges extending about said hub in substantially concentric spaced relation thereto and also extending above and below said hub, the lower flange of said annulus maintaining said capacitor spaced from said hub, the upper portion of said housing being formed under pressure about the peripheral portion of said annulus effective for providing a fluid tight seal therewith and between said annulus and said flange of said hub.

5. In an electrolytic capacitor of the class described, the combination of a substantially cylindrical housing closed at its lower end by a bottom wall, a wound capacitor element within said housing including an anode and a cathode substantially impregnated with a fluid, said capacitor being spaced from said bottom wall and said cathode having connection to said bottom wall, an external cathode terminal attached to said bottom wall, and sealing means closing the upper end of said housing, said sealing means comprising a metallic insert with a hub having between its ends an outwardly extending annular flange, and an annulus of resilient insulating material extending about said flange and inwardly over the opposite faces thereof in pressure sealing contact therewith, said annulus having upper and lower flanges concentric with said hub and extending above and below the ends thereof, the lower flange of said annulus maintaining said capacitor spaced from said hub, the upper end portion of said housing being formed under pressure about the peripheral portion of said annulus effective for providing a fluid tight seal therewith and between said annulus and said flange of said hub, said anode being connected to said hub.

6. In an electrolytic capacitor of the class described, the combination of a tubular housing having a closed bottom end and an open upper end, a capacitor winding within said tubular housing comprising an anode foil, a cathode foil, and an intervening layer of absorbent paper wound together in a spiral winding which is substantially impregnated with an electrolyte in said housing, a welding tab extending downwardly from said cathode foil and having welded attachment to the inner side of the closed bottom end of said tubular housing, a plurality of sinuated loops formed in said welding tab to absorb vibration and shock between the lower end of said capacitor winding and said bottom end of the housing, an external cathode terminal welded to the outer side of the closed bottom end of said housing, and an upper end seal closing the open upper end of said housing above said capacitor winding, said end seal comprising a metallic insert having a hub and a circular metallic sealing flange radiating outwardly therefrom, a ring shaped rubber annulus molded over a substantial portion of said metallic insert and having a circular outwardly beaded portion enveloping the circular metallic sealing flange of said insert, an external anode terminal welded to the upper side of said metallic insert, a sinuated welding tab extending upwardly from said anode foil, a weld joining the upper portion of said latter tab to the underside of said metallic insert, and beads rolled in said tubular housing above and below the circular outwardly beaded portion of the rubber annulus.

7. In an electrolytic capacitor of the class described, the combination of a tubular housing having a closed bottom end and an open upper end, a capacitor winding within said tubular housing comprising an anode foil, a cathode foil, and an intervening layer of absorbent paper wound together in a spiral winding which is substantially impregnated with an electrolyte in said housing, a welding tab extending downwardly from said cathode foil and having welded attachment to the inner side of the closed bottom end of said tubular housing, a plurality of sinuated loops formed in said welding tab to absorb vibration and shock between the lower end of said capacitor winding and said bottom end of the housing, an external cathode terminal welded to the outer side of the closed bottom end of said housing, and an upper end seal closing the open upper end of said housing above said capacitor winding, said end seal comprising a metallic insert having a hub and a circular metallic sealing flange radiating outwardly therefrom, a tab connecting said anode foil to said metallic insert, a ring shaped rubber annulus molded over a substantial portion of said metallic insert and having a circular outwardly beaded portion enveloping the circular metallic sealing flange of said insert, said rubber annulus also comprising annular rubber flanges projecting upwardly and from said circular outwardly beaded portion adjacent to the inner margins thereof.

8. In an electrolytic capacitor of the class described, the combination of a tubular housing having a closed bottom end and an open upper end, a capacitor winding within said tubular housing comprising an anode foil, a cathode foil, and an intervening layer of absorbent paper wound together in a spiral winding which is substantially impregnated with an electrolyte in said housing, a welding tab extending downwardly from said cathode foil and having welded attachment to the inner side of the closed bottom end of said tubular housing, an external cathode terminal welded to the outer side of the closed bottom end of said housing, an upper end seal closing the open upper end of said housing above said capacitor winding, said end seal comprising a metallic insert having a hub and a circular metallic sealing flange radiating outwardly therefrom, a ring shaped rubber annulus molded over a substantial portion of said metallic insert and having a circular outwardly beaded portion enveloping the circular metallic sealing flange of said insert, upper and lower annular rubber barrier flanges projecting upwardly and downwardly from the inner perimeter portions of said outwardly beaded portion, said upper and lower barrier flanges extending to distances substantially above and below the hub portion of said metallic insert, welding tab means extending upwardly from said anode foil and having welded attachment to the underside of said metallic insert, and an external anode terminal welded to the upper side of said metallic insert.

9. In an electrolytic capacitor of the class described, the combination of a substantially cylindrical housing closed at its lower end by a bottom wall, a spirally wound capacitor winding within said housing comprising an anode foil and a cathode foil and substantially impregnated with an electrolyte, a welding tab connecting said cathode foil to said bottom wall, an external cathode terminal attached to said bottom wall, and sealing means closing the upper end of said housing, said sealing means comprising a metallic insert with a hub having between its ends an outwardly extending annular flange and an annulus extending about said flange and inwardly over the opposite faces thereof in pressure sealing contact therewith, said annulus having upper and lower flanges concentric with said hub and extending above and below the ends thereof, the upper end portion of said housing being formed under pressure about the peripheral portion of said annulus effective for providing a fluid-tight seal therewith and between said annulus and flange of said hub, said anode foil being connected to said hub.

References Cited

UNITED STATES PATENTS

| | | | |
|---|---|---|---|
| 2,665,329 | 1/1954 | Brennan | 317—230 |
| 2,803,693 | 8/1957 | Kurland et al. | 317—230 |
| 2,885,607 | 5/1959 | Bugel | 317—230 |

JAMES D. KALLAM, *Primary Examiner.*